F. HUTTENLOCHER.
APPARATUS FOR INDICATING THE LEVEL OF PETROL IN THE PETROL CONTAINER
OF MOTOR CARS AND THE LIKE.
APPLICATION FILED JUNE 14, 1907.

904,874.

Patented Nov. 24, 1908.

Witnesses:
R. H. Flint.
Chas. E. Bruce.

Inventor:
Friedrich Huttenlocher.
by
A. P. Greeley
Attorney.

UNITED STATES PATENT OFFICE.

FRIEDRICH HUTTENLOCHER, OF UNTERTÜRKHEIM-STUTTGART, GERMANY, ASSIGNOR TO JULIUS OSTERTAG, OF STUTTGART, GERMANY.

APPARATUS FOR INDICATING THE LEVEL OF PETROL IN THE PETROL-CONTAINER OF MOTOR-CARS AND THE LIKE.

No. 904,874.   Specification of Letters Patent.   Patented Nov. 24, 1908.

Application filed June 14, 1907. Serial No. 379,030.

*To all whom it may concern:*

Be it known that I, FRIEDRICH HUTTENLOCHER, a citizen of the German Empire, residing at Untertürkheim-Stuttgart, in the Kingdom of Würtemberg, Empire of Germany, have invented certain new and useful Improvements in Apparatus for Indicating the Level of Petrol in the Petrol-Container of Motor-Cars and the Like, of which the following is a description, reference being had to the accompanying drawing, and to the letters and figures of reference marked thereon.

This invention relates to an apparatus serving for indicating the level of the petrol in petrol tanks and is more particularly adapted for use with motor cars.

The apparatus consists substantially of a float which is immersed in the petrol and transmits to a spring controlled visible index or pointer the increase or diminution of the petrol, the pointer indicating on a scale the level of the contents of the tank. A person using such an apparatus on a motor car can not only visibly and constantly inform himself of the quantity of petrol in stock even while the car is running, but can also ascertain and check or control the consumption during the journey in the simplest way. Protection is also afforded by the apparatus constituting the present invention, which cannot be tampered with from the outside, against the unauthorized withdrawal of petrol from the container, while the motor car is in a garage. When the tank is refilled with petrol the float is lifted by the latter, whereupon the spring turns the pointer back into the initial position. In order to prevent oscillation of the float, even when traveling at high speed, it is arranged in a tube inside the petrol tank and is provided with projections with which it rests against the walls of the tube, so that adhesion thereto or rattling thereon is prevented.

Figure 1:
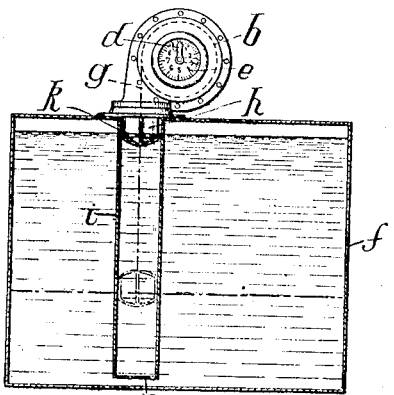
Figure 2:
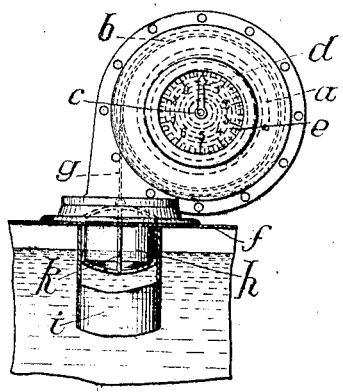
Figure 3:
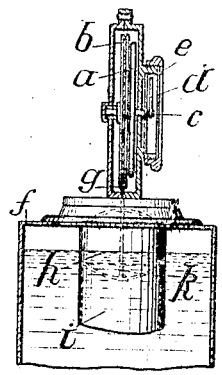
Figure 4:
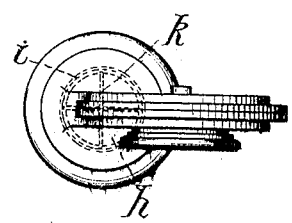
Figure 5:
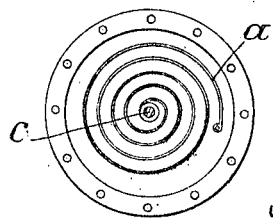

The object of this invention is shown in one form of construction, as an example, in the accompanying drawings, in which, Figure 1 is a sectional front view of the petrol container; Fig. 2, a front view of the indicating device on an enlarged scale; Fig. 3, a side view of Fig. 2 in axial section; Fig. 4, a plan view; while Fig. 5 is a view showing the relative relation of the spring to the case and spindle.

The apparatus according to this invention has a spiral spring *a* of watch spring type, one end of which spring is fast while its other end is connected with a small wheel *b* which is mounted on a spindle *c*. The spindle *c* is supported in bearings in a suitable case and is revoluble and carries an index or pointer *d* which moves over a suitable scale *e*, the division of which corresponds for instance to the liter contents of the petrol container *f*. A cord or the like is provided which is connected with the small wheel *b* and runs over the same, on which cord a float *h* is suspended which is immersed in the petrol. In order to prevent oscillation of the float *h* when the car is running, it is guided in a tube *i* which communicates with the petrol container *f*, while by the arrangement of longitudinal projections *k* on the float *h* it is prevented adhering to the tube *i* as it only comes in contact with it at a few points. Finally a sieve *l* is provided at the bottom of the guide tube *i* which prevents the penetration of bodies into the guide tube *i*, so that jamming of the float *h* is thereby prevented and its reliable working insured.

I declare that what I claim is:—

In a device of the class described, a closed tank; a vertically arranged tube depending from the top wall of said tank and open at its bottom; a casing cylindrical in form and having a tangentially arranged inlet secured to the top wall of said tank and in communication with said tube; a horizontally arranged spindle having bearings in the end walls of said casing; a grooved wheel within said casing and mounted upon said spindle; a spiral spring within said casing having its ends attached thereto and to said spindle; a pointer carried by said spindle; a cord attached to said grooved wheel and extending through the tangential inlet leading into said casing; a float attached to said cord and adapted to move in said tube; and projections upon said float to engage the inner surface of said tube as the float moves therein, the relative arrangement of the parts being such that the axial line of said tube is tangential to said grooved wheel.

In testimony whereof I affix my signature, in presence of two witnesses.

FRIEDRICH HUTTENLOCHER.

Witnesses:
JEAN GULDEN,
HERM. HOPPE.